United States Patent [19]

Ishizuka

[11] Patent Number: 5,283,651
[45] Date of Patent: Feb. 1, 1994

[54] METHOD FOR MAGNIFYING AND REDUCING AN IMAGE

[75] Inventor: Shigeki Ishizuka, Kanagawa, Japan

[73] Assignee: Sony Corporation, Tokyo, Japan

[21] Appl. No.: 739,236

[22] Filed: Aug. 1, 1991

[30] Foreign Application Priority Data

Aug. 10, 1990 [JP] Japan .................. 2-212592

[51] Int. Cl.$^5$ ............................ H04N 3/223
[52] U.S. Cl. ................... 348/704; 348/240; 348/910
[58] Field of Search .......... 358/180, 140, 160, 22, 358/167, 166; H04N 3/223, 5/04

[56] References Cited

U.S. PATENT DOCUMENTS

| | | | |
|---|---|---|---|
| 4,610,026 | 9/1986 | Tabata et al. | 358/180 X |
| 4,792,856 | 12/1988 | Shiratsuchi | 358/180 |
| 4,951,125 | 8/1990 | Kojima et al. | 358/160 X |
| 5,029,001 | 7/1991 | Tanaka et al. | 358/140 |
| 5,089,893 | 2/1992 | Iwase | 358/180 |
| 5,124,804 | 6/1992 | Socarras | 358/148 X |
| 5,136,398 | 8/1992 | Rodriguez-Cavazos et al. | 358/180 X |

*Primary Examiner*—Victor R. Kostak
*Attorney, Agent, or Firm*—Lewis H. Eslinger; Jay H. Maioli

[57] ABSTRACT

A video signal processing method for use in magnifying and reducing an image by interpolating a scanning line within a field when an interlaced original video signal is magnified or reduced by a factor of m/n (m, n are natural numbers), wherein origins of an odd field and an even field for magnifying or reducing processing are offset so as to be equally distanced from adjacent scanning lines within the odd field and the even field, whereby the origins of the odd and even fields for magnifying and reducing processing are set at a common position, and the local filter characteristic is made equal in the odd and even fields, thereby removing a line flicker in an image after the magnifying and reducing processing has been performed and a flicker caused by the vertical resolution differing from one field to another.

3 Claims, 14 Drawing Sheets

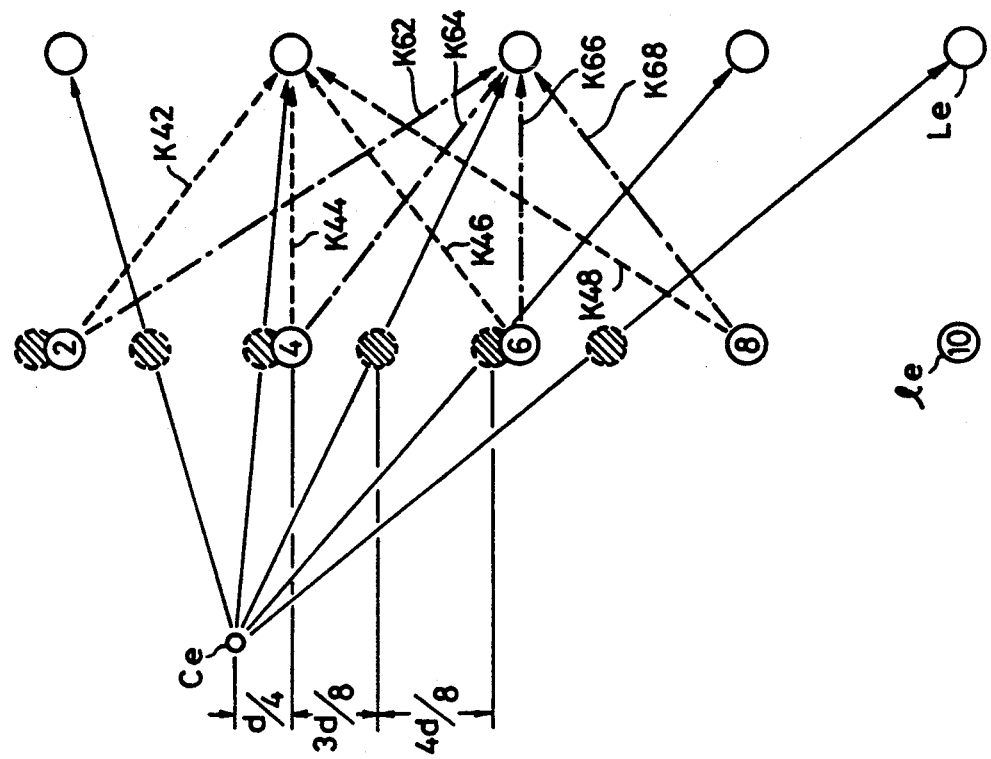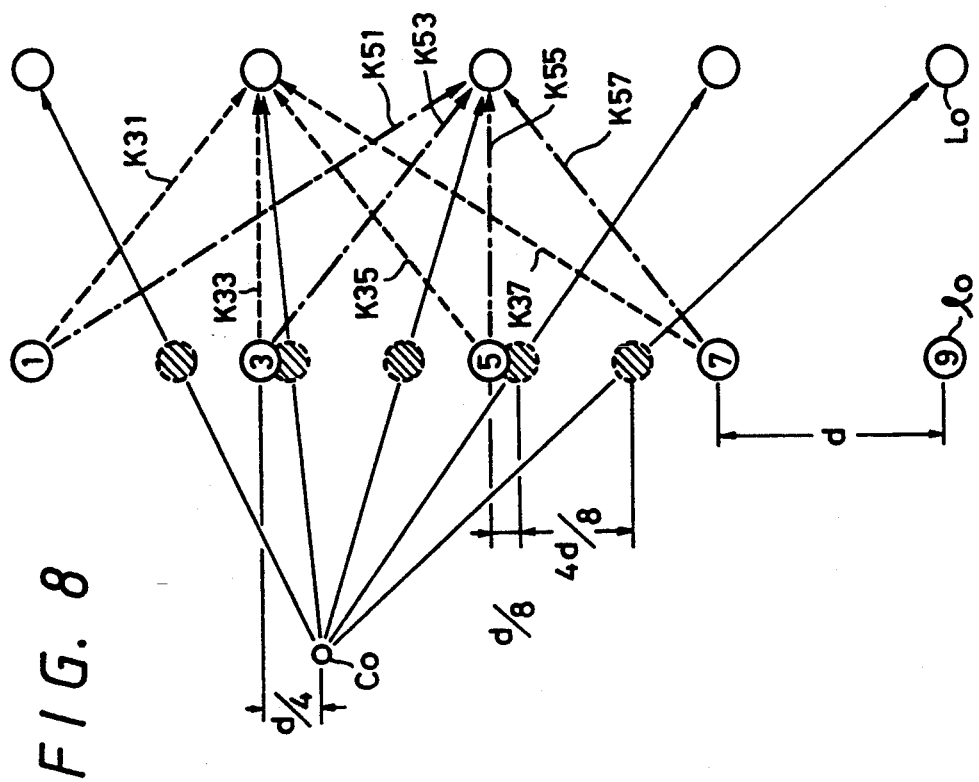
FIG. 8

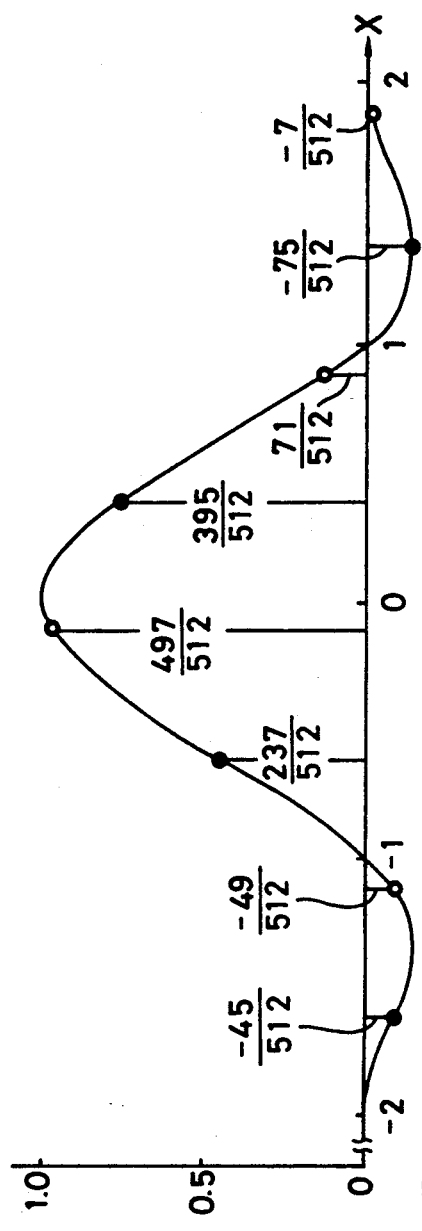
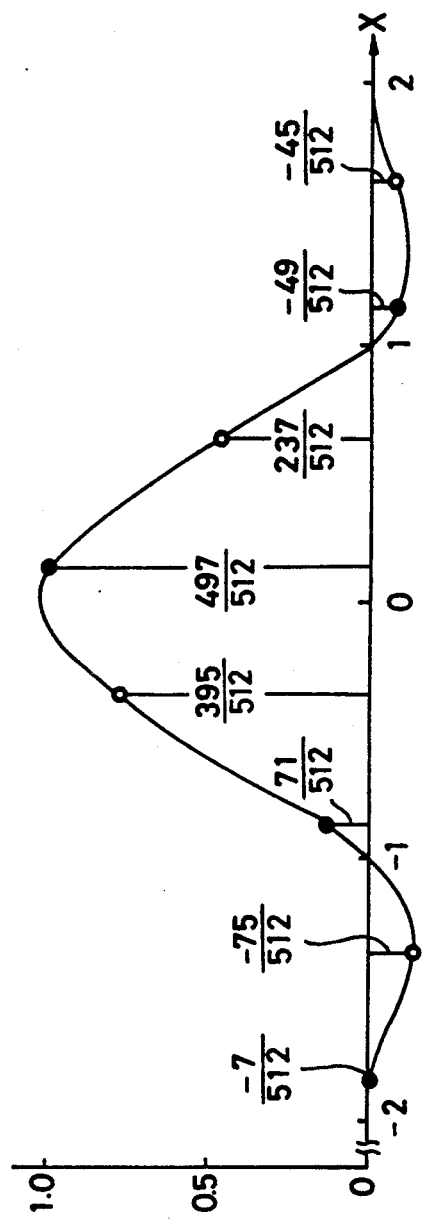
FIG. 10A
FIG. 10B

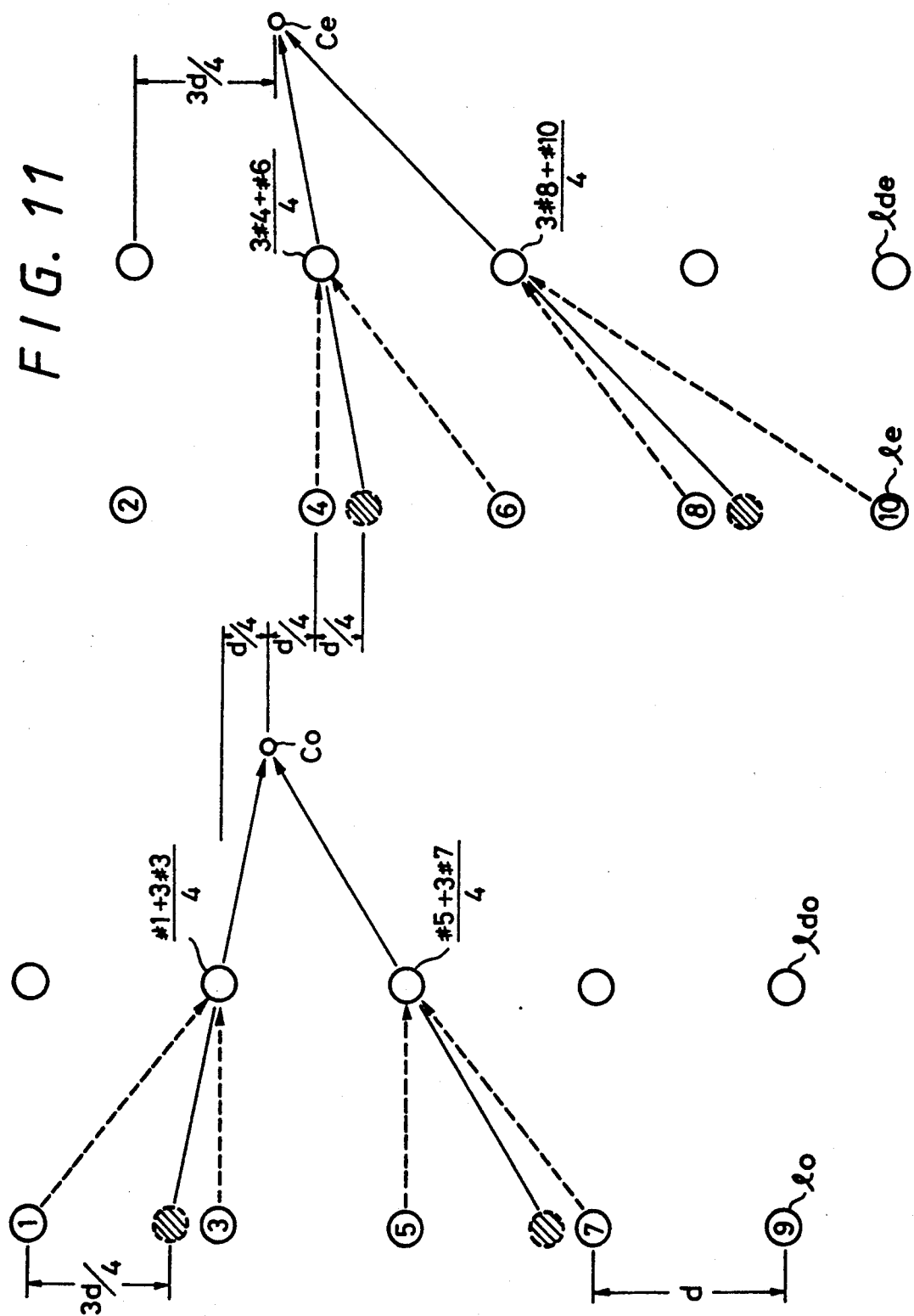

METHOD FOR MAGNIFYING AND REDUCING AN IMAGE

BACKGROUND OF THE INVENTION

1. Field of the Invention

This invention relates to a video signal magnifying and reducing processing method for interlaced images suitable for use in an electronic zoom or the like used for television cameras.

2. Description of the Prior Art

In a conventional processing for magnifying an interlaced image, for example, for a twice magnification, origins Co, Ce of an odd field and an even field for the magnifying processing are set independently of each other, as shown in FIG. 1, and the intervals d between respective scanning lines (lines) lo, le of the odd and even fields constituting the original image are respectively magnified by a factor of two, and the interlace relationship between lines Lo, Le of the odd and even fields is maintained even in a magnified image.

Incidentally, in the example of FIG. 1 and so on, in a manner different from ordinary methods, the lines of the odd field are designated odd numbers while the lines of the even field are designated even numbers such that the lines in a reproduced image have sequential numbers.

In the case of FIG. 1, a bi-linear method, for example, is applied to each of the odd and even fields, as indicated by hatching and broken lines, to interpolate the space between lines, whereby the intervals between lines of the respective fields in the magnified image (scanning line density) are made equal to the scanning line density of the original image.

In the bi-linear method, assuming that a sampling point is represented by xi, an interpolated position by xj, and an interpolating function by f(x), an interpolation calculation is performed as given by the following equation (1):

$$I(xj) = I(xi)f(xj-xi) + I(xi+1)f(xj-xi+1) \ldots \quad (1)$$

$$\text{where } f(x) = \begin{cases} -x+1 & \ldots \quad 0 \leq x \leq 1 \\ x+1 & \ldots \quad -1 \leq x \leq 0 \\ 0 & \ldots \quad x < -1, 1 < x \end{cases}$$

Further, as shown in FIG. 2, when the origins Co, Ce of the odd and even fields for a magnifying processing are respectively set at a common position, the respective lines Lo, Le of the odd and even fields in a magnified image are mutually interlaced, whereby the interpolation is performed between respective lines to make the scanning line density of the magnified image equal to that of the original image.

On the other hand, in a processing for reducing an interlaced image, for example, by a factor of two, origins Co, Ce of an odd field and an even field for the reduction processing are respectively set at a common position as shown in FIG. 3, and the interval between respective lines lo of the odd field constituting an original image is reduced by a factor of two, while the interval between respective lines le of the even field is reduced by a factor of two after interpolation between lines, thereby maintaining the interlace relationship between lines ldo, lde of the odd and even fields even in a reduced image.

In this event every other line constituting the original image is dropped in the odd field, while each pair of two adjacent lines is interpolated in the even field, thereby making the scanning line density of each field constituting the reduced image equal to the scanning line density of the original image.

The above-mentioned interpolation between lines, however, implies problems such as a line flicker, a flicker of the vertical resolution in each field or the like, in addition to deterioration of the vertical resolution in a still image.

More specifically, when the origins Co, Ce of the odd and even fields for magnification are set independently of each other as shown in the foregoing FIG. 1, magnification has been clearly carried out in each field. Nevertheless, since the phase of the origins Co, Ce for magnification are deviated from each other, the reproduced image vertically pitches in every field, thereby causing a line flicker phenomenon.

Further, when the origins Co, Ce of the odd and even field for magnification are located at a coincident position as shown in FIG. 2, the line flicker phenomenon as mentioned above is improved. However, the odd and even fields respectively have a different interpolation coefficient for performing the interpolation between lines as shown in FIG. 2, that is, stated other way, the odd and even fields respectively present different local filter characteristics, so that the degree of degradation of the vertical resolution in a reproduced image is different at every field, which results in generating a flicker of the vertical resolution.

Incidentally, when the origins Co, Ce of the odd and even fields for magnification are set independently of each other as shown in the foregoing FIG. 1, the local filter characteristic is equal in the odd and even fields, so that the flicker of the vertical resolution will not be generated.

On the other hand, when the origins Co, Ce of the odd and even fields for reduction are set at a common position as shown in the foregoing FIG. 3, the the local filter characteristic is different in the odd and even fields, so that the flicker of the vertical resolution is likewise generated.

OBJECTS AND SUMMARY OF THE INVENTION

Accordingly, it is an object of the present invention to provide a video signal magnifying and reducing processing method in which the aforementioned shortcomings and disadvantages encountered with the prior art can be eliminated.

More specifically, it is an object of the present invention to provide a video signal magnifying and reducing processing method which is capable of removing a line flicker which may be generated in an image after a magnifying or reducing processing of an arbitrary magnification and a flicker of the vertical resolution in each field.

As an aspect of the present invention, a video signal magnifying and reducing processing method is provided for interpolating a scanning line within field when an interlaced original video signal is magnified or reduced by a factor of m/n (m, n are natural numbers). This video signal magnifying and reducing processing method is comprised of the step of offsetting origins of an odd field and an even field for magnifying or reducing processing at a position equally distanced from adjacent scanning lines between said odd field and said even field.

According to the above-mentioned arrangement, the origins of odd and even fields for the magnified and reduced processing are respectively set at a common position, and the local filter characteristic is made equal in the respective odd and even fields, thereby removing the line flicker generated in an image after the magnified or reduced processing and a flicker of the vertical resolution in each field.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 8 is a schematic diagram illustrating a concept of another embodiment of the present invention;

FIGS. 10A and 10B are graphs used for explaining the magnifying processing operation performed by the embodiment shown in FIG. 8;

FIG. 11 is a schematic diagram illustrating a concept of a further embodiment of the invention;

DETAILED DESCRIPTION OF THE PREFERRED EMBODIMENTS

Embodiments of a video signal magnifying and reducing processing method according to the present invention will hereinafter be described with reference to FIGS. 4 through 7.

Figure 1:
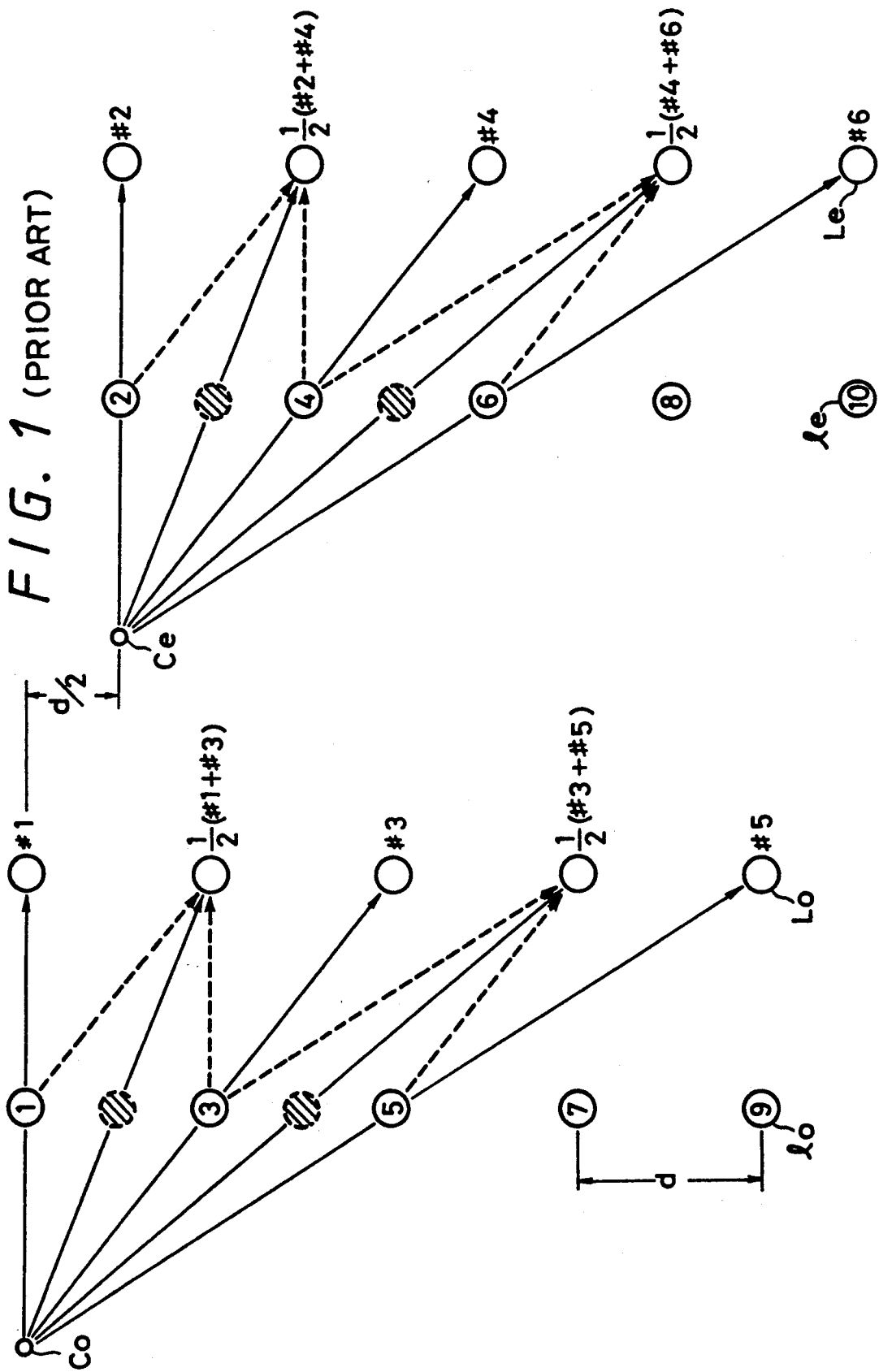
FIG. 1 is a schematic diagram illustrating a concept of a prior-art video signal magnifying and reducing processing method.
Figure 2:
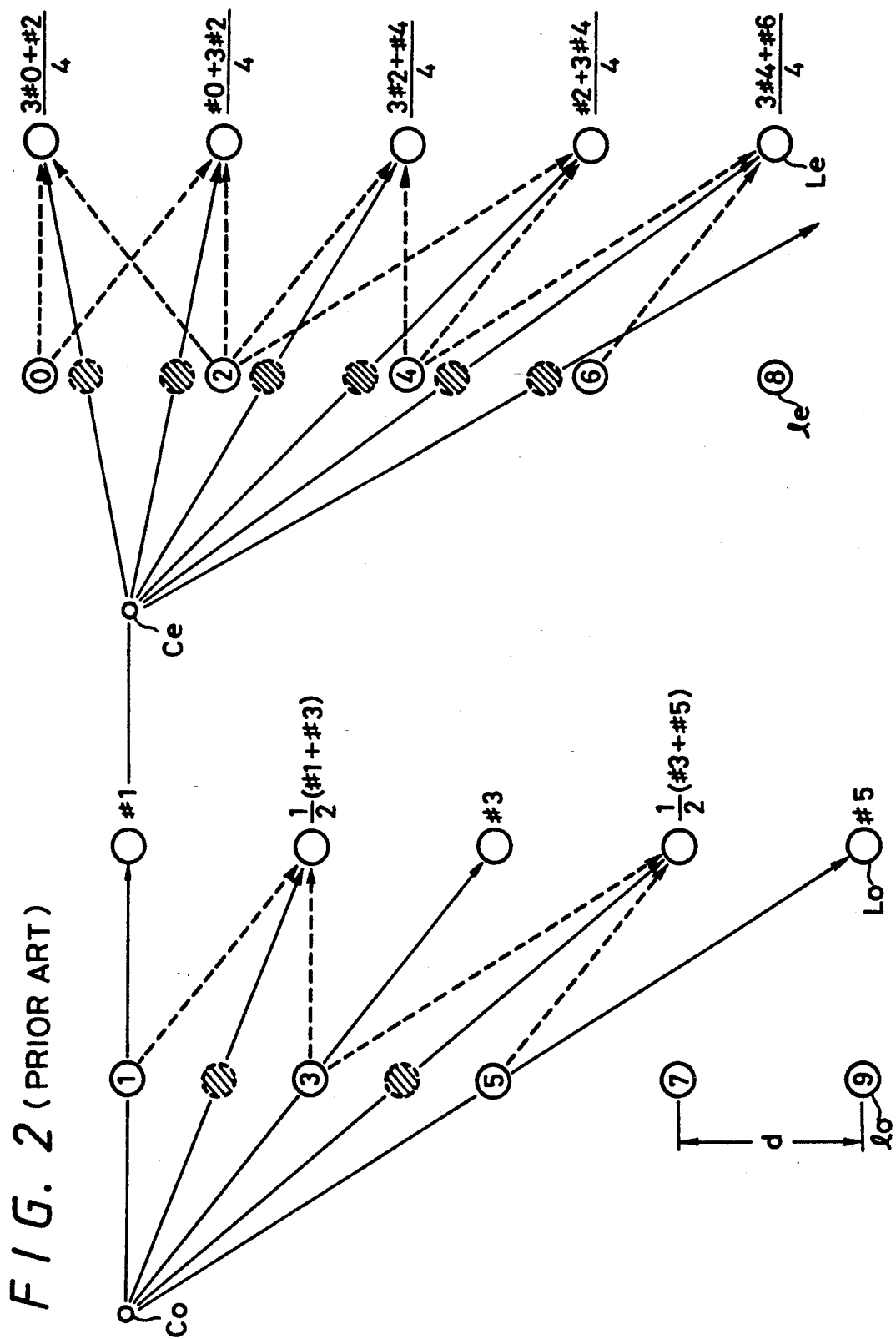
FIGS. 2 and 3 are schematic diagrams illustrating video signal magnifying and reducing concepts of other prior art example, respectively.
Figure 3:
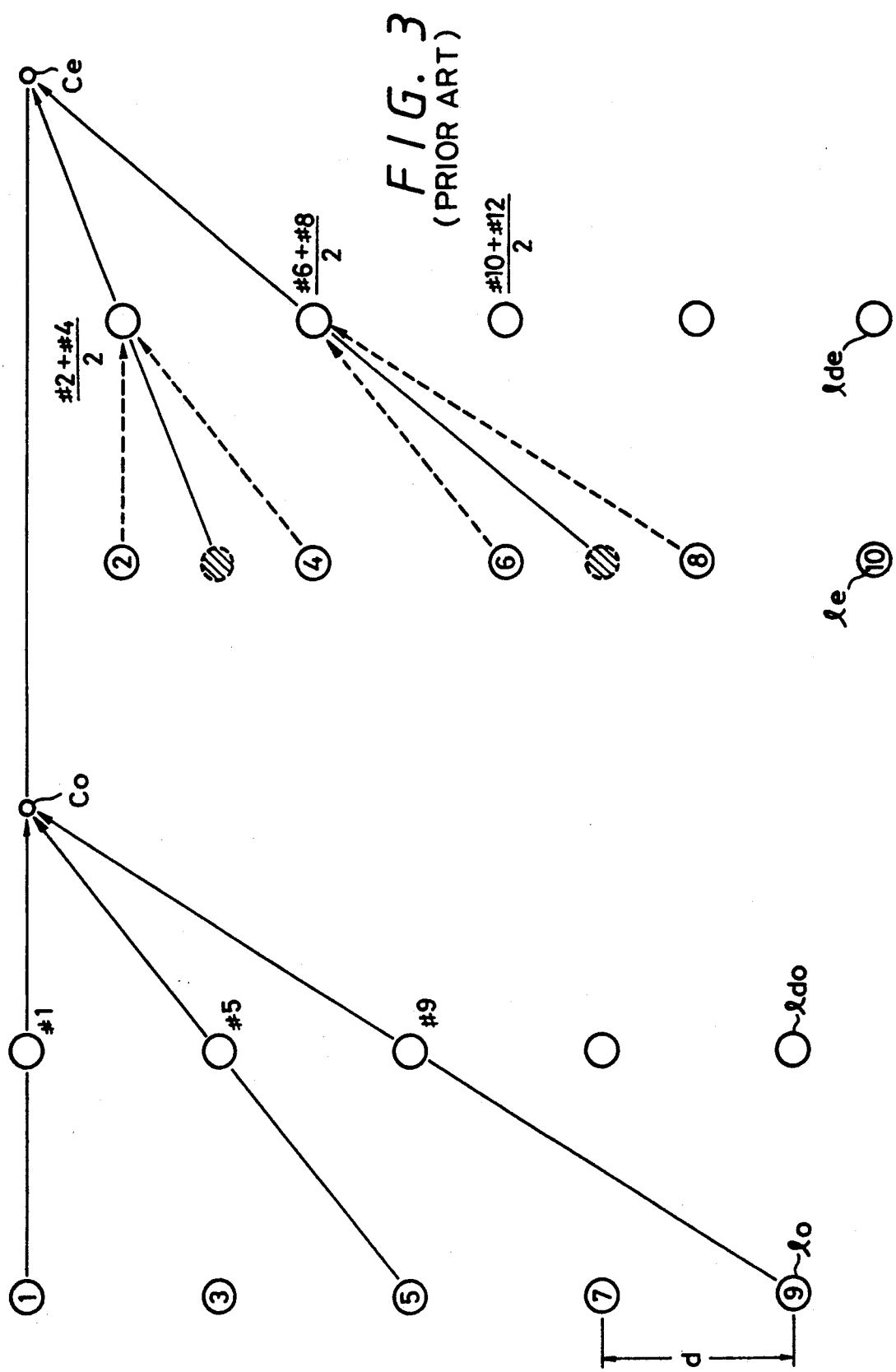
Figure 4:
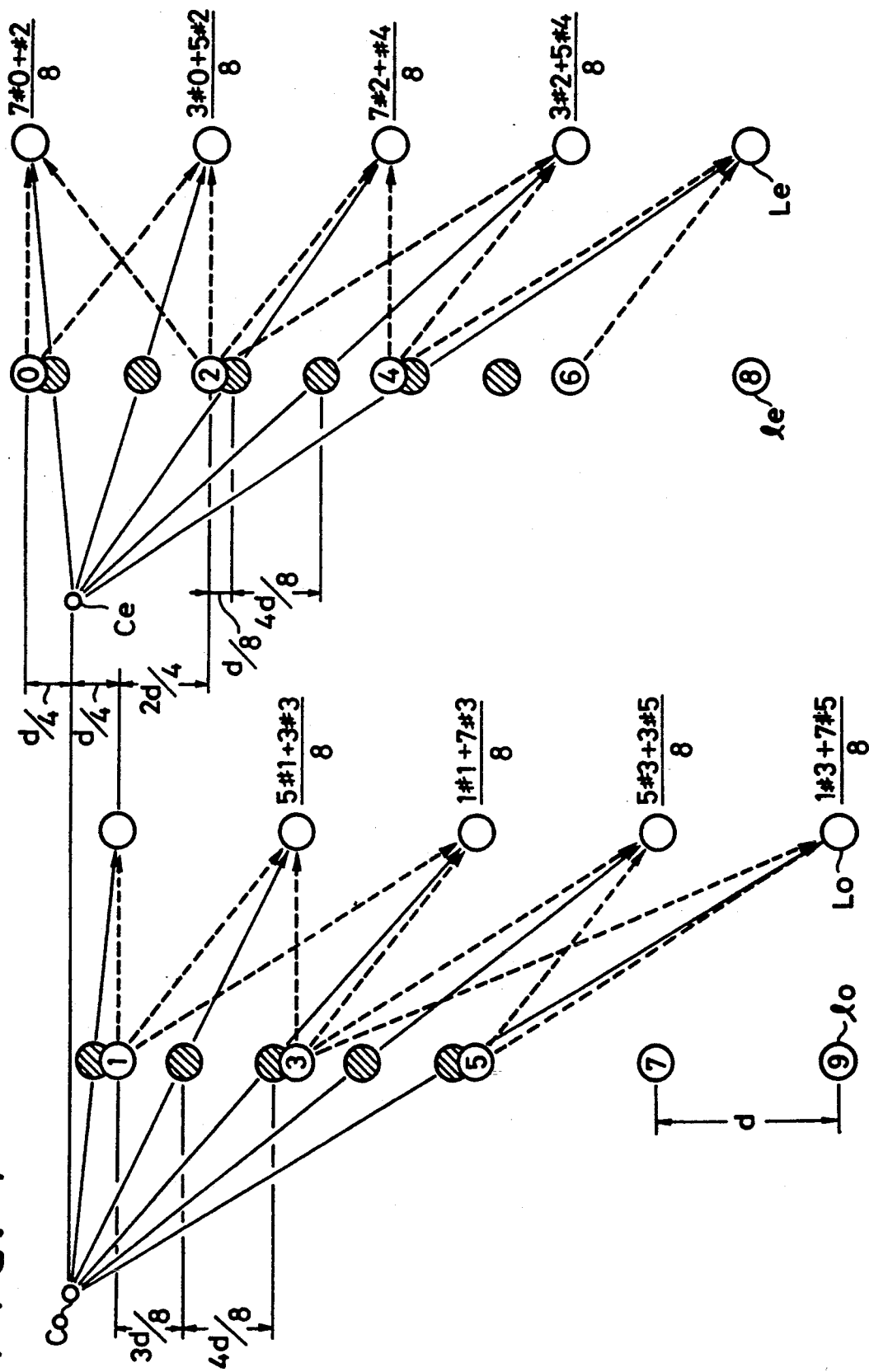
FIG. 4 is a schematic diagram illustrating a concept of an embodiment of the video signal magnifying and reducing processing method according to this invention.
Figure 5:
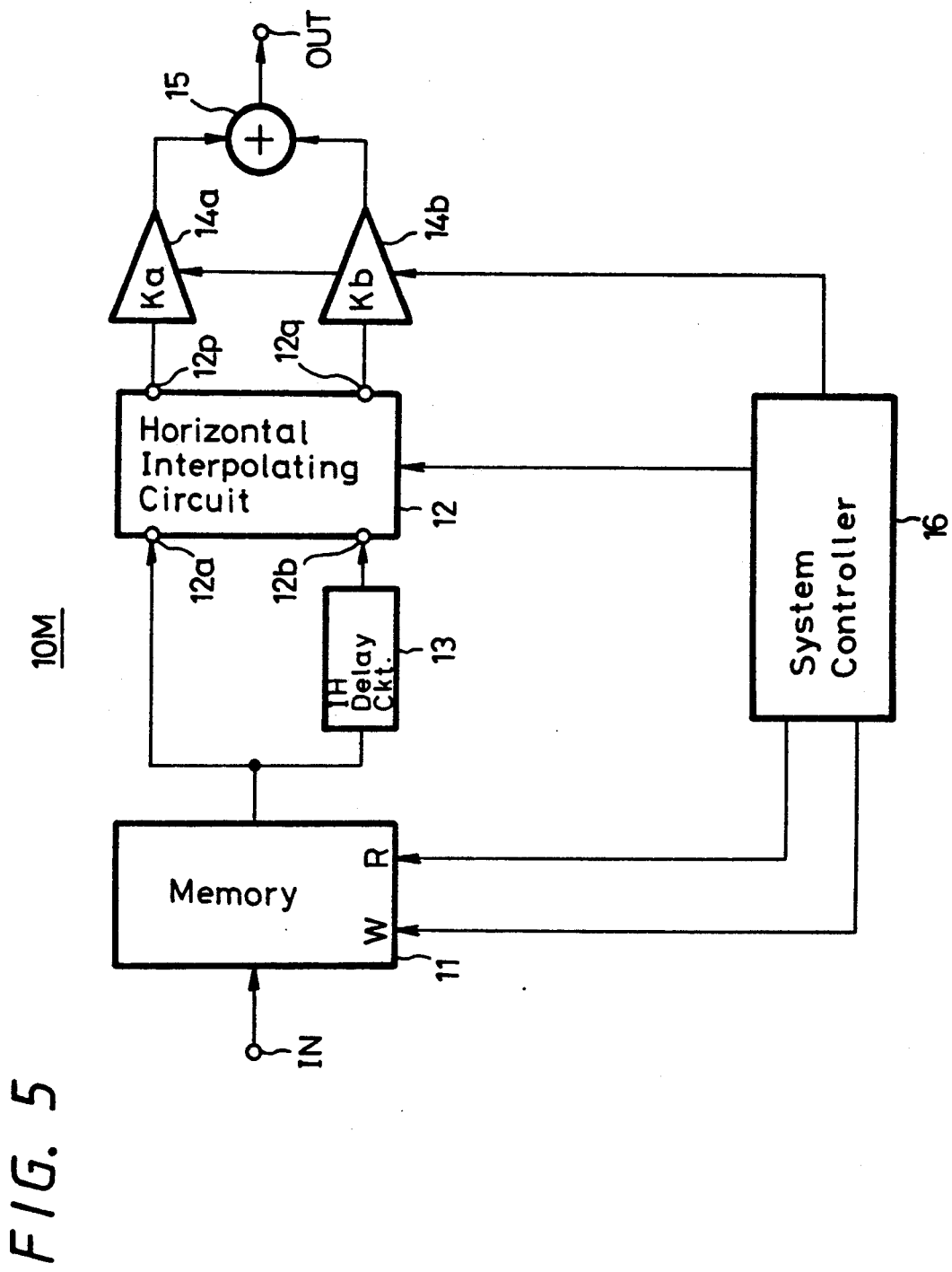
FIG. 5 is a block diagram illustrating the configuration of an exemplary reference to which the embodiment of the invention is applied.

FIG. 4 shows a concept of an embodiment of the invention, and FIG. 5 the configuration of a processing apparatus (an exemplary reference) to which this embodiment is applied.

In this embodiment, as shown in FIG. 4, for a twice magnification, by way of example, origins Co, Ce of odd and even fields for magnification are upwardly offset by $\frac{1}{4}$ and $\frac{3}{4}$ of an interval d between lines, for example, with respect to #1 line and #2 line of an original image, respectively, but are set at coincident positions between the odd and even fields. More specifically, the origin Ce of the even field for magnification is downwardly offset by $\frac{1}{4}$ of the line interval d, for example, with respect to #0 line.

As shown by the hatched portions in FIG. 4, interpolated positions in the odd field are downwardly offset by $\frac{1}{4}$ and $\frac{3}{4}$ of the line interval d between every adjacent two lines, while interpolated positions in the even field are downwardly offset by $\frac{1}{4}$ and $\frac{3}{4}$ of the line interval d, whereby the respective interpolated positions are respectively offset by $\frac{1}{4}$ of the line interval d between the odd and even fields.

In FIG. 5, reference 10M designates an image magnifying processing apparatus which employs the bi-linear interpolation method. Image data fed from an input terminal IN is written into a memory 11, and the image data read out of the memory 11 is directly supplied to one input terminal 12a of a horizontal interpolation circuit 12 as well as to the other input terminal 12b of the same through a line delay line 13 having a delay time of one line period (H). Outputs delivered at output terminals 12p, 12q of the horizontal interpolation circuit 12 are supplied to coefficient circuits 14a, 14b, respectively, and outputs from both coefficient circuits 14a, 14b are delivered to an output terminal OUT through an adder 15.

Reference numeral 16 designates a system control circuit which supplies control signals to the memory 11, the horizontal interpolation circuit 12 and the coefficient circuits 14a, 14b.

Incidentally, the horizontal interpolation circuit 12 is generally composed of a finite impulse response (FIR) type transversal filter that, however; which however is not directly related to the present invention, so that a detailed description thereof will be omitted.

Also, while an interpolation processing performed by a magnifying and reducing processing apparatus as mentioned above basically treats digital signals, descriptions relative to A-D conversion and D-A conversion will be all omitted in this specification for the sake of simplicity.

Next, a magnifying processing performed by the embodiment of this invention will be described further with reference to FIGS. 6A and 6B.

In this embodiment, the origins Co, Ce of the odd and even fields for magnification are equally offset by d/4 upwardly and downwardly, for example, with respect to the #1 line and the #0 line of an original image, respectively, as shown in FIG. 4, so as to be set at a coincident position between the fields. Thus, as shown by the hatched portions in FIG. 4, respective interpolated positions in both fields of the original image are offset by d/4 in the odd and even fields.

Then, an interpolation coefficient at each interpolated position is derived by the above-mentioned bi-linear interpolation method. In this embodiment, the sum of the interpolation coefficients for the respective lines constituting a magnified image becomes [1], as shown in FIG. 4, while coefficients Ka, Kb (=1−Ka) provided by the coefficient circuits 14a, 14b shown in FIG. 5 are controlled in accordance with each field and each line in the following manner.

Figure 6A:
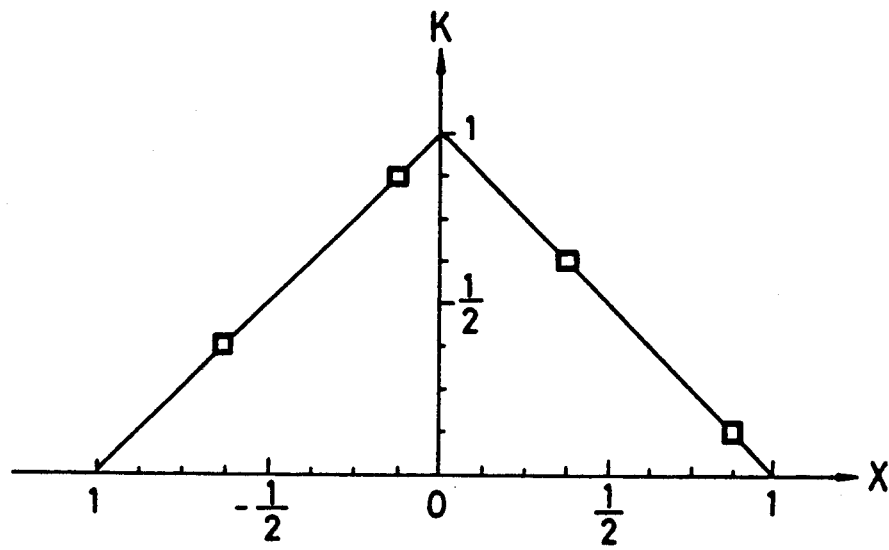
FIGS. 6A and 6B are graphs graphing distributions of interpolation coefficients, and to which references will be made in explaining the magnifying processing operation performed by the embodiment shown in FIG. 4.
Figure 6B:
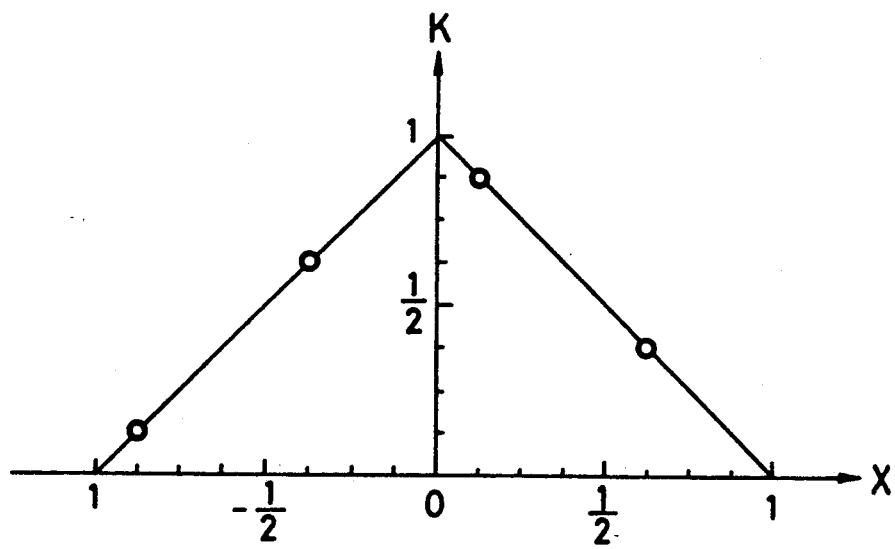

In an odd field, #3 line in an original image, for example, is used for interpolation of four lines in a magnified image as shown in FIG. 4, and the respective interpolation coefficients relative to the #3 line are ⅞, ⅝, ⅜ and ⅛ as shown in FIG. 6A. Also in an even field, the #2 line in the original image is used for interpolation of four lines in the magnified image, and the respective interpolation coefficients relative to the #2 line, are, ⅛, ⅜, ⅝ and ⅞ as shown in FIG. 6B. In other words, the local filter characteristic is equal in the odd and eve fields.

In this embodiment, the line flicker phenomenon is thus improved in a magnified image processed by the operation shown in FIG. 4 and the occurrence of the flicker of vertical resolution is prevented.

Also in this embodiment, the origin Co of the odd field for magnification may be set at a position downwardly offset by d/4, for example, with respect to the #1 line. In this case, the origin Ce of the even field for magnification is downwardly offset by 3d/4, for example, with respect to the #0 line such that the positions of the origins for magnification are set at a coincident position in both fields, whereby the offset quantity of the origins Co, Ce of the odd and even fields for magnification and the interpolated positions in each field are opposite to the case shown in FIG. 4.

Generally, for magnifying an image by a factor of m/n (m, n are natural numbers), the origin Co of the odd field for magnification is set at a position downwardly offset by d/4 with respect to a line, while the origin Ce of the even field for magnification is set at a position upwardly offset by d/4 with respect to a line, whereby the positions of the origins for magnification are set at a coincident position in both odd and even fields, as described above.

Figure 7:
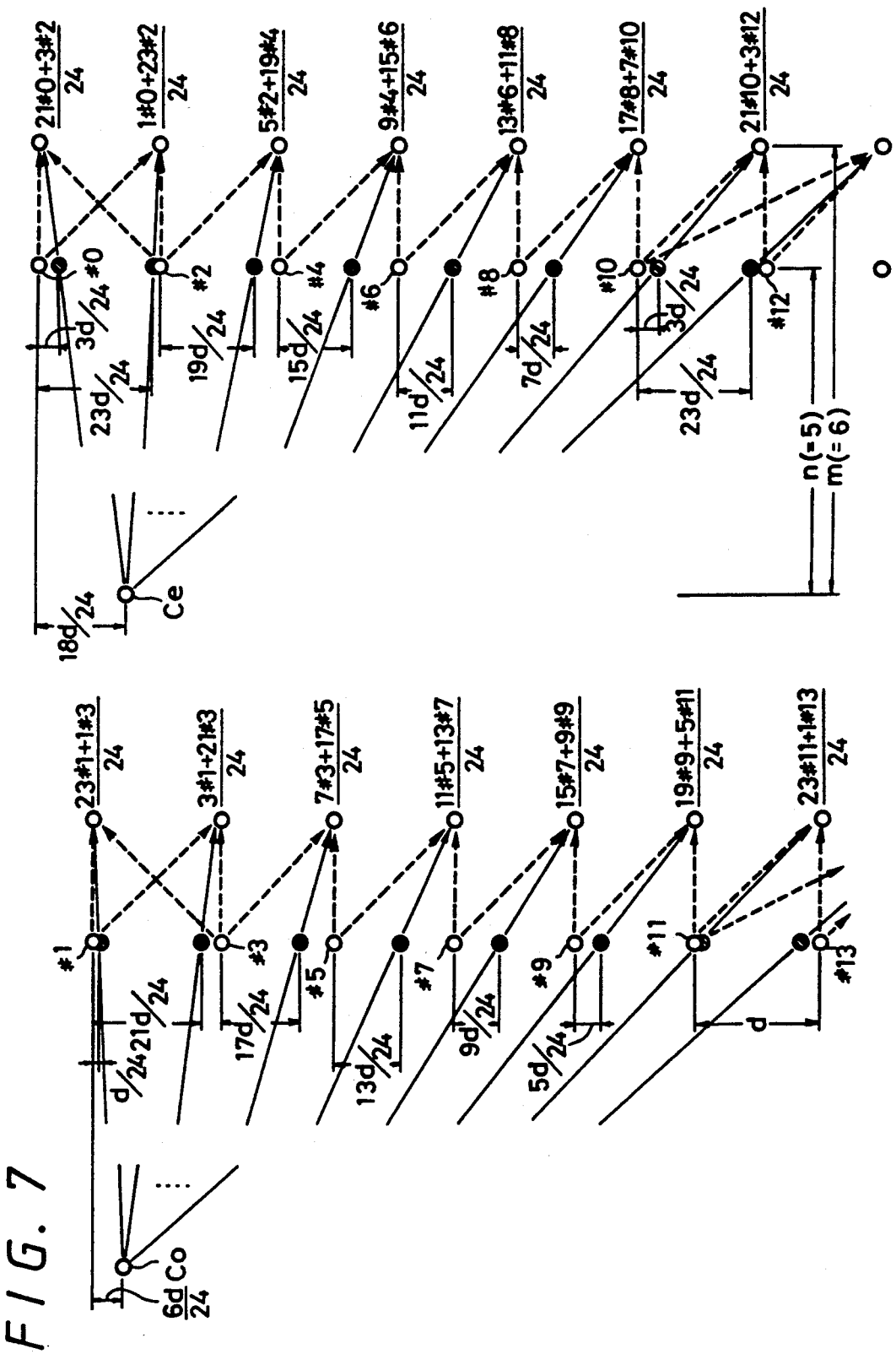
FIG. 7 is a schematic diagram used to explain the magnifying processing operation performed by the embodiment shown in FIG. 4.

Respective interpolated positions in the odd and even fields are set on the basis of the offsets effected to the origins Co, Ce for magnification, as shown in FIG. 7. Incidentally, FIG. 7 is drawn with m=6 and n=5.

In FIG. 7, the origin Co of the odd field for magnification is set at a position downwardly offset by ¼ of the line interval d, for example, with respect to the #1 line of an original image, while the origin Ce of the even field for magnification is set at a position upwardly offset by ¼ of the line interval d, for example, with respect to the #2 line of the original image, whereby both origins are set at the same position in both fields.

By the above setting, interpolated positions in the odd field shown by the hatched portions in FIG. 7 are respectively set at positions downwardly offset by 1/24 and 21/24 of the line interval d between the #1 and #3 lines of the original image. Also, interpolated positions between lines #3 and #5, #5 and #7, #7 and #9, and #9 and #11 are downwardly offset by 17/24, 13/24, 9/24 and 5/24 of the line interval d, respectively, and the same setting is subsequently repeated.

On the other hand, interpolated positions in the even field are respectively set at positions downwardly offset by 3/24 and 23/24 of the line interval d between the #0 and #2 lines of the original image. Also, interpolated positions between lines #2 and #4, #4 and #6, #6 and #8, #8 and #10 are downwardly offset by 19/24, 15/24, 11/24 and 7/24 of the line interval d, respectively, and the same setting is subsequently repeated.

Also in the embodiment shown in FIG. 7, the interpolation coefficients at respective interpolated positions are derived by the aforementioned bi-linear interpolation method in accordance with each field and each line.

As shown in FIG. 7, in the odd field, for example, after the #3 line of the magnified image, the interpolation coefficient relative to each forward line at an interpolated position in the original image sequentially increases from 3/24 to 23/24 by 4/24, while the interpolation coefficient relative to each subsequent line sequentially decreases from 21/24 to 24/1 by 4/24. In the even field, on the other hand, for example, after the #2 line of the magnified image, the interpolation coefficient relative to each forward line at an interpolated position in the original image sequentially increases from 1/24 to 21/24 by 4/24, while the interpolation coefficient relative to each subsequent line sequentially decreases from 23/24 to 3/24 by 4/24.

In other words, the local filter characteristic is equal in the odd and even fields also in the embodiment shown in FIG. 7.

Thus, the line flicker phenomenon is improved and the flicker of the vertical resolution is prevented also in the magnified image processed by the operation shown in FIG. 7.

Generally, interpolated positions xo, xe in odd and even fields are given by the following equations (2), (3), respectively:

$$xo = \frac{(1 + 4n \cdot j) \bmod 4m}{4m} \quad (2)$$

$$xe = \frac{(3 + 4n \cdot j) \bmod 4m}{4m} \quad (3)$$

Another embodiment of the video signal magnifying processing method according to this invention will be described with reference to FIG. 8 through FIGS. 10A, 10B.

Figure 9:
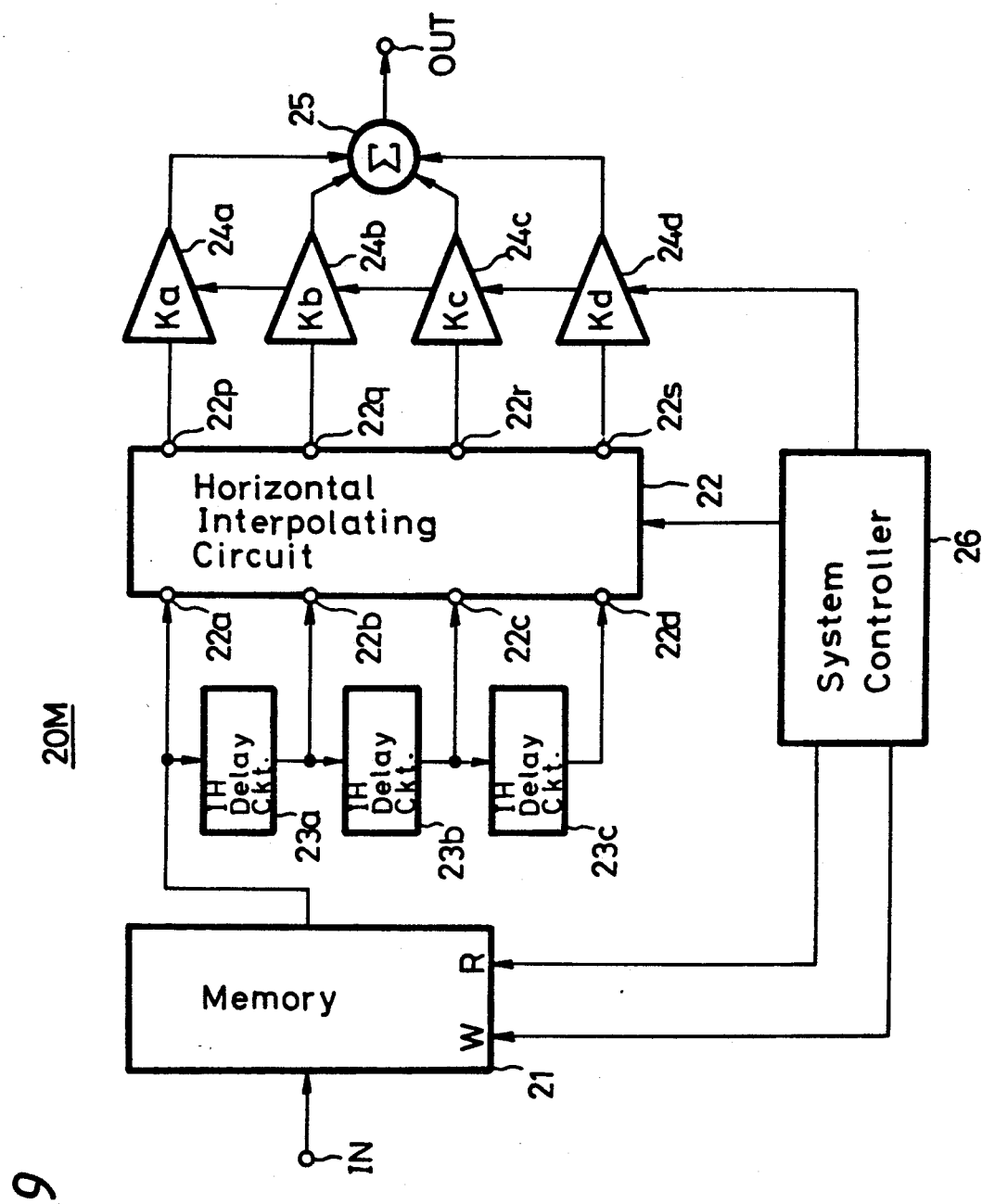
FIG. 9 is a block diagram illustrating the configuration of an exemplary reference to which the embodiment shown in FIG. 8 is applied.

FIG. 8 shows a concept of another embodiment of the present invention, and FIG. 9 shows the configuration of a processing apparatus (an exemplary reference) to which this embodiment is applied. In FIG. 9, like parts corresponding to those in the foregoing FIG. 5 are marked with the reference numerals having the same final digits, and will not be described fully.

As shown in FIG. 8, also in this embodiment, for example, for a twice magnification, origins Co, Ce of odd and even fields for magnification are respectively offset upwardly and downwardly relative to, for example, #3 and #4 lines of the original-image by ¼ of a line interval d, to thereby be set at a coincident position between both fields.

Thus, between two adjacent lines in both fields of an original image, interpolated positions in the odd field are set at positions downwardly offset by ¼ and ⅝ of the line interval d, respectively, while interpolated positions in the even field are set at positions downwardly offset by ⅜ and ⅞ of the line interval d, respectively.

In FIG. 9, reference 20 M designates a video signal magnifying processing apparatus employing a cubic convolution method. An output from a memory 21 in which video data from an input terminal IN is written is supplied directly to a first input terminal 22a of a horizontal interpolation circuit 22 as well as to input terminals of three 1 H delay lines 23a, 23b and 23c connected in a cascade manner. The video data is then supplied from the respective intermediate connecting points and output terminal of the line delay lines 23a, 23b and 23c to second to fourth input terminals 22b, 22c and 22d of the horizontal interpolation circuit 22. Outputs from four output terminals 22p, 22q, 22r and 22s of the horizontal interpolation circuit 22 are respectively supplied to four coefficient circuits 24a, 24b, 24c and 24d. Outputs from the respective coefficient circuits 24a-24d are delivered to an output terminal OUT through an adder 25.

The memory 21, the horizontal interpolation circuit 22 and the four coefficient circuits 24a-24d are supplied with control signals from a system control circuit 26.

The magnifying processing operation performed by the other embodiment of the invention will be described further with reference to FIGS. 10A, 10B.

Generally, in an interpolation calculation, the use of an interpolation function in the form of $y = (\sin x)/x$ is ideal, however, such an interpolation function cannot be implemented by an adequate circuit scale, so that this embodiment employs a cubic convolution method as represented by the following equation (4):

$$I(xj) = I(xi-1)f(xj-xi-1) + I(xi)f(xj-xi) + I(xi+1)f(xj-xi+1) + I(xi+2)f(xj-xi+2) \ldots \quad (4)$$

where f(x) is an interpolation function which is represented by a third order function as the following equation (5) and is significant within a range from $+2$ to $-2$ as shown in FIGS. 10A, 10B.

$$f(x) = \begin{cases} 1 - 2x^2 + |x|^3 & (0 \leq |x| < 1) \\ 4 - 8|x| + 5x^2 - |x|^3 & (1 \leq |x| < 2) \\ 0 & (2 \leq |x|) \end{cases} \quad (5)$$

Then, an interpolation coefficient at each interpolated position is derived by the above-mentioned cubic convolution interpolation method, and the coefficients Ka-Kd provided by the coefficient circuits 24a-24d shown in FIG. 9 are controlled in accordance with each field and each line in the following manner.

As shown in FIG. 8, in the odd field, #3 line of the magnified image, for example, corresponds to a forward interpolated position between #3 and #5 lines of the original image and is interpolated by four lines, that is, forward #1 line and subsequent #7 line in addition to the #3 and #5 lines of the original image, as indicated by broken lines. Meanwhile, the #5 line of the magnified image, for example, corresponds to a subsequent interpolated position between #3 and #5 lines of the original image and is interpolated by four lines or the above-mentioned #1-#7 lines as indicated by one-dot-chain lines.

In the even field, on the other hand, #4 line of the magnified image, for example, corresponds to a forward interpolated position between #4 and #6 lines of the original image and is interpolated by four lines, that is, forward #2 line and subsequent #8 line in addition to the #4 and #6 lines of the original image. Meanwhile, the #6 line of the magnified image, for example, corresponds to a subsequent interpolated position between the #4 and #6 lines of the original image and is interpolated by four lines or the above-mentioned #2-#8 lines.

In this event, the interpolation coefficient presents values as shown in FIGS. 10A, 10B and the following TABLE 1. It will be understood, also in this embodiment, that the line flicker phenomenon is improved and the local filter characteristic is made equal in the odd and even fields to thereby prevent the occurrence of the flicker of the vertical resolution.

TABLE 1

| ODD FIELD | | EVEN FIELD | |
|---|---|---|---|
| FORWARD INTERPOLATED POINT | SUBSEQUENT INTERPOLATED POINT | FORWARD INTERPOLATED POINT | SUBSEQUENT INTERPOLATED POINT |
| INTERPOLATION COEFFICIENT | | | |
| −49/512 | −45/512 | −75/512 | −7/512 |
| 497/512 | 237/512 | 395/512 | 71/512 |
| 71/512 | 395/512 | 237/512 | 497/512 |
| −7/512 | −75/512 | −45/512 | −49/512 |

A further embodiment of the video signal reducing processing method according to the present invention will next be described with reference to FIGS. 11 and 12.

Figure 12:
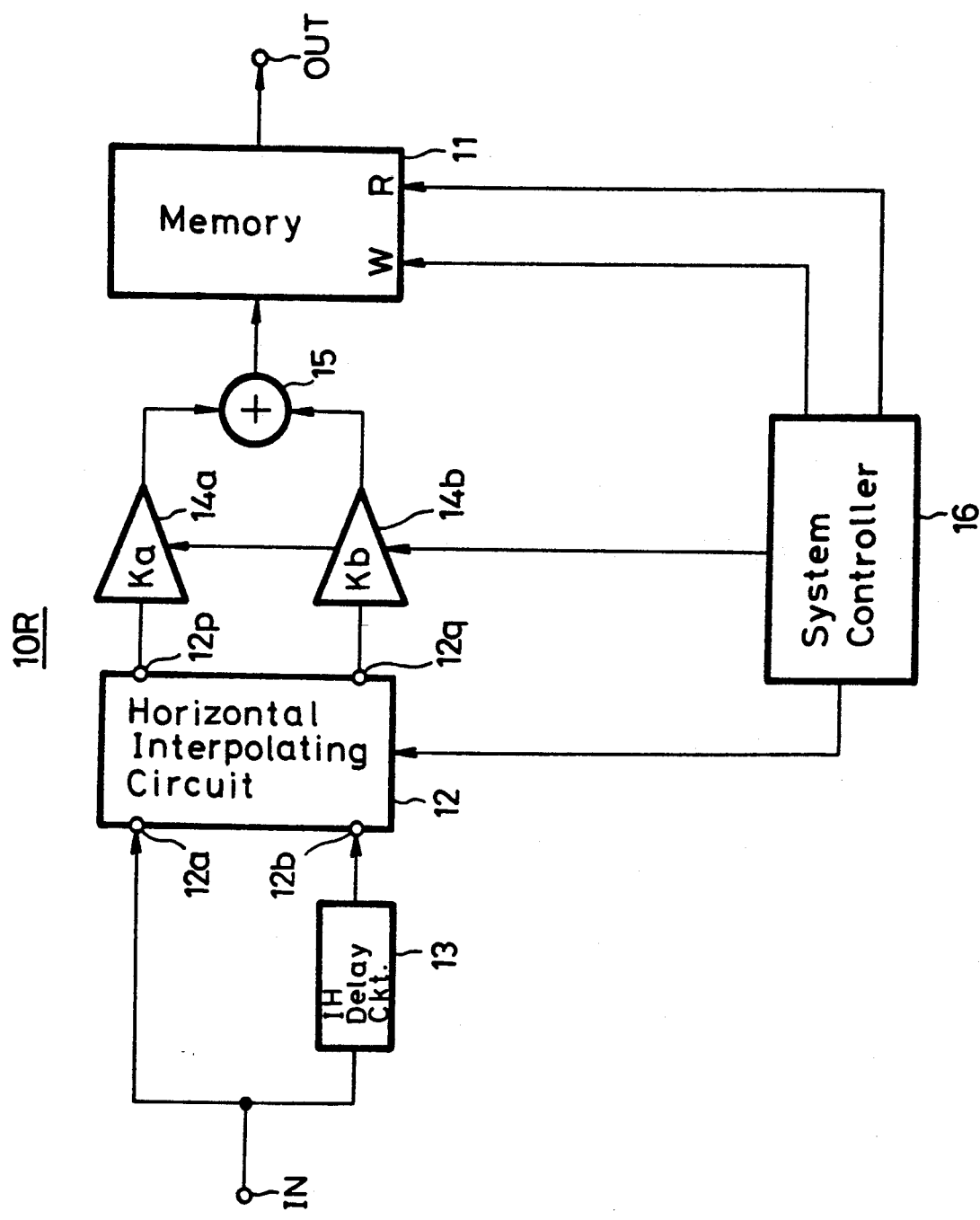
FIG. 12 is a block diagram illustrating the configuration of an exemplary reference to which the embodiment shown in FIG. 10 is applied.

FIG. 11 shows a concept of the further embodiment of the invention, and FIG. 12 the configuration of a processing apparatus (an exemplary reference) to which this embodiment is applied. In FIG. 11, like parts corresponding to those in the foregoing FIG. 5 are designated the same reference numerals and a description thereof will be partially omitted.

As shown in FIG. 11, also in this embodiment, for example, for reducing an original image by a factor of two, origins Co, Ce of odd and even fields for reduction are offset by ¼ of a line interval d upwardly and downwardly, for example, with respect to #3 and #4 lines of the original image, respectively, to thereby be set at a coincident position between both fields.

Thus, between two adjacent lines in both fields of the original image, each interpolated position in the odd field is set at a position downwardly offset by ¼ of the line interval d from the forward line, while each interpolated position in the even field is set at a position downwardly offset by ¼ of the line interval d from the forward line.

In FIG. 12, reference 10R designates a video signal reducing processing apparatus employing the bi-linear interpolation method, wherein the memory 11 employed in the video signal magnifying processing apparatus 10M shown in the foregoing FIG. 5 is disposed on the side of an output terminal OUT in place of being disposed on the side of an input terminal IN.

More specifically, video data fed from the input terminal IN is supplied directly to one input terminal 12a of a horizontal interpolation circuit 12 as well as to the other input terminal 12b of the same through a 1 H delay line 13. Then, outputs from coefficient circuits 14a, 14b are written into the memory 11 through an adder 15, and video data read out of the memory 11 is delivered to the output terminal OUT.

The rest of the configuration is similar to that of the foregoing FIG. 5.

Next, a reduced processing operation performed by the embodiment shown in FIG. 11 will be described.

In this embodiment, as shown in FIG. 11, the origins Co, Ce of the odd and even fields for reduction are equally offset by d/4 upwardly and downwardly from the #3 and #4 lines of the original image, respectively, to thereby be set at a coincident position between both fields. As shown by the hatched portions in FIG. 11, respective interpolated positions in both fields of the original image are respectively offset by the line interval d between the odd and even fields.

Then, the interpolation coefficient is derived at each interpolated position by the aforementioned bi-linear interpolation method. In this embodiment, the sum of the interpolation coefficients at respective lines constituting a reduced image becomes [1], and coefficients Ka, Kb (=1−Ka) provided by the coefficient circuits 14a, 14b shown in FIG. 12 are controlled in accordance with each field and each line in the following manner.

As shown in FIG. 11, in this embodiment, two lines of an original image are used for interpolating a single line of a reduced image in the odd and even fields, wherein the interpolation coefficients relative to forward and subsequent lines are ¼ and ⅜, respectively, in the odd field. In the even field, the interpolation coefficients relative to forward and subsequent lines are ⅜ and ¼, respectively. In other words, the local filter characteristic is equal in the odd and even fields.

It will be understood from the above description that the line flicker phenomenon is improved and the occurrence of the flicker of the vertical resolution is prevented in a reduced image processed by this embodiment.

A yet further embodiment of the video signal reducing processing method according to the invention will be described with reference to FIGS. 13 and 14.

Figure 13:
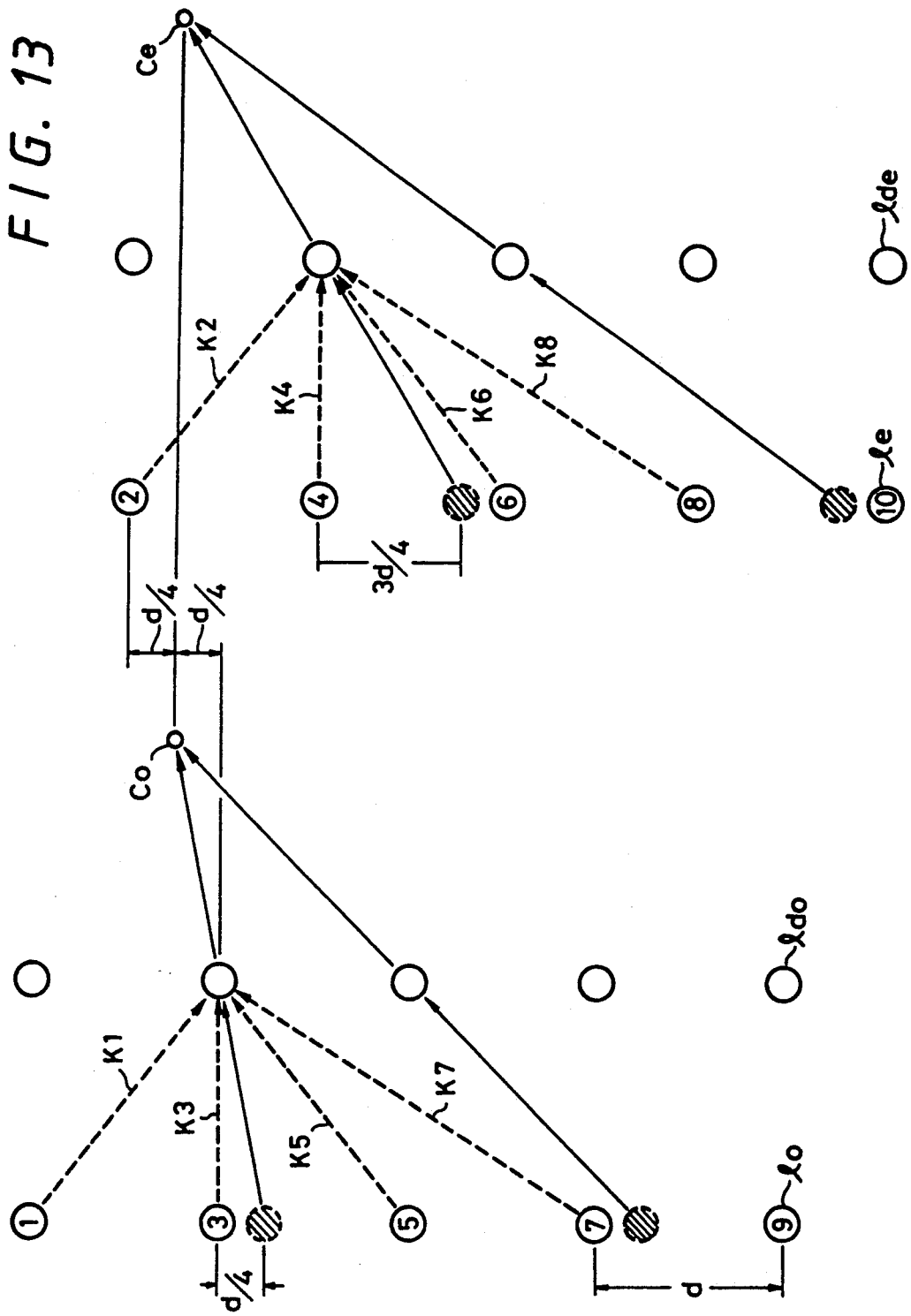
FIG. 13 is a schematic diagram illustrating a concept of a yet further embodiment of the invention.
Figure 14:
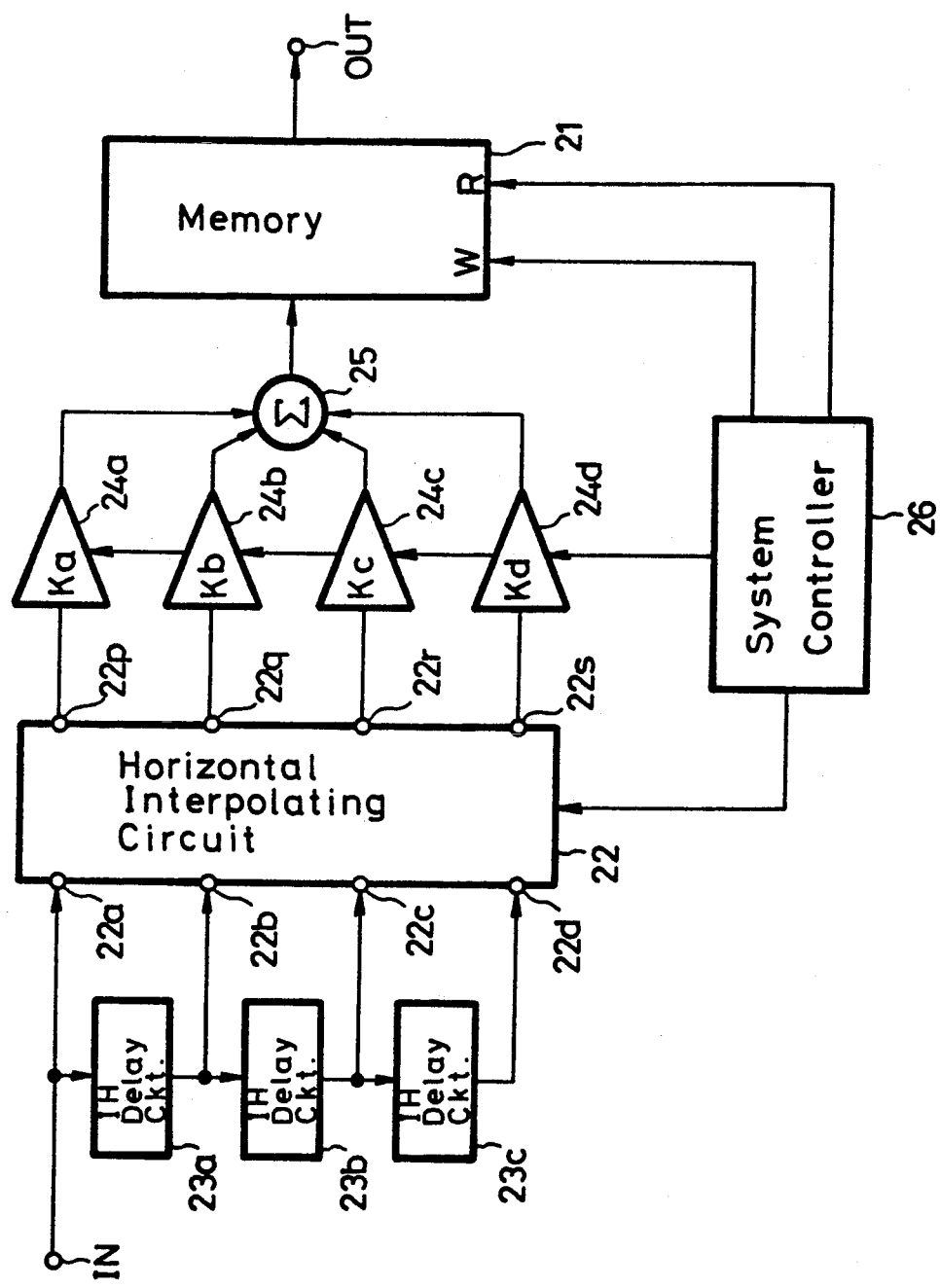
FIG. 14 is a block diagram illustrating the configuration of an exemplary reference to which the embodiment shown in FIG. 13 is applied.

FIG. 13 shows a concept of yet further embodiment of the invention, and FIG. 14 shows the configuration of a processing apparatus (an exemplary reference) to which this embodiment is applied. In FIG. 14, parts corresponding to those in the foregoing FIG. 9 are designated the same reference numerals, and a description thereof will be partially omitted.

As shown in FIG. 13, also in this embodiment, for example, for reducing an original image by a factor of two, origins Co, Ce of odd and even fields for reduction are offset by ¼ of a line interval d upwardly and downwardly, for example, with respect to #3 and #2 lines of the original image to thereby be set at a coincident position between both fields.

Thus, between two adjacent lines in both fields of the original image, an interpolated position at every other line in the odd field is set at a position downwardly offset by ¼ of the line interval d from the forward line, while an interpolated position at every other line in the even field is set at a position downwardly offset by ¾ of the line interval d from the forward line.

In FIG. 14, reference 20R designates a video signal reducing processing apparatus employing the cubic convolution interpolation method, wherein the memory 11 employed in the video signal magnifying processing apparatus 20M shown in the foregoing FIG. 9 is disposed on the side of an output terminal OUT in place of being disposed on the side of an input terminal IN.

More specifically, video data fed from the input terminal IN is supplied directly to a first input terminal 22a of a horizontal interpolation circuit 22 as well as to input terminals of three 1 H delay lines 23a, 23b and 23c connected in a cascade manner. Outputs from coefficient circuits 24a, 24b, 24c and 24d are respectively written into the memory 21 through an adder 25, and video data read out of the memory 21 is delivered to the output terminal OUT.

The rest of the configuration thereof is similar to that of the foregoing FIG. 9.

A reducing processing operation performed by the embodiment shown in FIG. 13 will be described.

In this embodiment, as shown in FIG. 13, the origins Co, Ce of the odd and even fields for reduction are equally offset by d/4, upwardly and downwardly, for example, with respect to the #3 line and the #2 line of the original image, respectively, to thereby be set at a coincident position between the fields. Thus, as shown by the hatched portions in FIG. 13, each interpolated position in both fields of the original image is offset by d between the odd and even fields.

Then, the interpolation coefficient is calculated at each interpolated position by the aforementioned cubic convolution interpolation method, and coefficients Ka-Kd provided by the coefficient circuits 24a-24d shown in FIG. 14 are controlled in accordance with each field and each line in the following manner. As shown in FIG. 13, in the odd field, the #3 line of a reduced image, for example, corresponds to an interpolated position between #3 and #5 lines of the original image and is interpolated by four lines including forward #1 line and subsequent #7 line in addition to the #3 and #5 lines of the original image.

In the even field, on the other hand, #4 line of the reduced image, for example, corresponds to an interpolated position between #4 and #6 lines of the original image and is interpolated by four lines including the forward #2 line and subsequent #8 line in addition to #4 and #6 lines of the original image.

In this event, the respective interpolation coefficients are as shown in the following TABLE 2 from which it will be understood that the line flicker phenomenon is improved and the local filter characteristic is made equal in the odd and even fields to thereby prevent the occurrence of the flicker of the vertical resolution also in this embodiment.

TABLE 2

| ODD FIELD | EVEN FIELD |
| --- | --- |
| INTERPOLATION COEFFICIENT | |
| −72/512 | −24/512 |
| 456/512 | 152/512 |
| 152/512 | 456/512 |
| −24/512 | −72/512 |

As described above in detail, according to the present invention, it is possible to provide a video signal magnifying and reducing processing method for interpolating scanning lines in fields when an interlaced original video signal is magnified or reduced by a factor of m/n (m, n are natural numbers), wherein origins of an odd field and an even field for magnifying or reducing processing are offset so as to be equally distanced from adjacent scanning lines between the odd field and the even field, whereby the origins of the odd and even fields for magnifying and reducing processing are set at a common position, and the local filter characteristic is made equal in the odd and even fields, thereby removing a line flicker in an image after the magnifying and reducing processing has been performed and a flicker caused by the vertical resolution which differs from one field to another.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A video signal processing method for use in magnifying and reducing an image by interpolating at a plurality of positions between successive scanning lines within a field when an interlaced original video signal consisting of odd and even fields is magnified or reduced by a factor of m/n (m,n are natural numbers), said video signal processing method comprising the step of:

offsetting the origin of an odd field prior to magnifying or reducing processing at a predetermined distance from an adjacent scanning line in said odd field, and offsetting the origin of an even field prior to magnifying or reducing processing at said predetermined distance from an adjacent scanning line in said even field.

2. A video signal processing method according to claim 1, wherein said step of offsetting origins includes selecting an offset for the origins to be d/4 where d is the interval between said adjacent scanning lines.

3. A video signal processing method according to claim 1, further comprising the step of calculating an interpolation coefficient at each interpolation position.

* * * * *

UNITED STATES PATENT AND TRADEMARK OFFICE
CERTIFICATE OF CORRECTION

PATENT NO. : 5,283,651
DATED : February 1, 1994
INVENTOR(S) : Shigeki Ishizuka

It is certified that error appears in the above-indentified patent and that said Letters Patent is hereby corrected as shown below:

```
Col. 4, line 41, change ";" to --,--
        same line, delete "which however"
Col. 5, line 12, change "eve" to --even--
Col. 6, line 49, change "original-image" to --original image--

Col. 12, line 3, change "aid" to --said--
```

Signed and Sealed this

Twenty-fourth Day of January, 1995

Attest:

BRUCE LEHMAN

Attesting Officer     Commissioner of Patents and Trademarks